(12) United States Patent
Tittle

(10) Patent No.: US 6,955,715 B1
(45) Date of Patent: Oct. 18, 2005

(54) WATER-BASED AIR FILTER SYSTEM

(76) Inventor: Nicolas D. Tittle, 4218 Lauder La., Orange Beach, AL (US) 36561

( * ) Notice: Subject to any disclaimer, the term of this patent is extended or adjusted under 35 U.S.C. 154(b) by 91 days.

(21) Appl. No.: 10/683,999

(22) Filed: Oct. 14, 2003

(51) Int. Cl.[7] ............................................ B01D 47/02
(52) U.S. Cl. ..................................................... 96/351
(58) Field of Search ........................... 96/351; 95/226; 261/77, 121.1

(56) References Cited

U.S. PATENT DOCUMENTS

| | | | | |
|---|---|---|---|---|
| 1,358,333 A | * | 11/1920 | Rudloff ........................ 55/475 |
| 1,964,794 A | * | 7/1934 | Gilbert ........................ 422/193 |
| 2,198,322 A | * | 4/1940 | Von Schrader ............... 261/30 |
| 3,462,919 A | * | 8/1969 | Zalman ........................ 96/351 |
| 3,520,113 A | * | 7/1970 | Stokes ......................... 96/279 |
| 3,733,782 A | * | 5/1973 | Hatchel ........................ 95/214 |
| 4,874,404 A | * | 10/1989 | Boswell ....................... 95/151 |
| 4,939,809 A | * | 7/1990 | Park ............................ 15/328 |
| 5,017,201 A | * | 5/1991 | Park ............................ 96/228 |
| 5,143,527 A | * | 9/1992 | Tian-Song ................... 96/351 |
| 5,888,277 A | * | 3/1999 | Lin ............................. 96/223 |
| 6,391,093 B1 | * | 5/2002 | French et al. ................ 95/226 |

* cited by examiner

Primary Examiner—Frank M. Lawrence

(57) ABSTRACT

A water-based air filter system for recycling and cleaning the air found in industrial plants, in particular. The water-based air filter system includes a support base; and also includes a tank being disposed in the support base and being at least partially-filled with water and having an inlet hole being disposed through a wall thereof, and also having an outlet hole being disposed through the wall thereof; and further includes an air inlet spout being extended through the inlet hole and into the water in the tank; and also includes an air outlet spout being extended through the outlet hole and being extended from the tank; and further includes an outside air suction assembly being mounted upon the support base and being connected to the air inlet spout for drawing polluted air into the water in the tank.

3 Claims, 1 Drawing Sheet

US 6,955,715 B1

WATER-BASED AIR FILTER SYSTEM

BACKGROUND OF THE INVENTION

1. Field of the Invention

The present invention relates to air filtering systems and more particularly pertains to a new water-based air filter system for recycling and cleaning the air found in industrial plants, in particular.

2. Description of the Prior Art

The use of air filtering systems is known in the prior art. More specifically, air filtering systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,812,656; U.S. Pat. No. 5,704,954; U.S. Pat. No. 5,589,132; U.S. Pat. No. 3,757,494; U.S. Pat. No. 5,017,201; and U.S. Pat. No. Des. 214,375.

While these devices fulfill their respective, particular objectives and requirements, the aforementioned patents do not disclose a new water-based air filter system. The prior art includes apparatuses having housings and also having motors and fans and filters disposed in the housings which are used to remove pollutants from the air.

SUMMARY OF THE INVENTION

The general purpose of the present invention, which will be described subsequently in greater detail, is to provide a new water-based air filter system which has many of the advantages of the air filtering systems mentioned heretofore and many novel features that result in a new water-based air filter system which is not anticipated, rendered obvious, suggested, or even implied by any of the prior art air filtering systems, either alone or in any combination thereof. The present invention includes a support base; and also includes a tank being disposed in the support base and being at least partially-filled with water and having an inlet hole being disposed through a wall thereof, and also having an outlet hole being disposed through the wall thereof; and further includes an air inlet spout being extended through the inlet hole and into the water in the tank; and also includes an air outlet spout being extended through the outlet hole and being extended from the tank; and further includes an outside air suction assembly being mounted upon the support base and being connected to the air inlet spout for drawing polluted air into the water in the tank. None of the prior art includes the combination of the elements of the present invention.

There has thus been outlined, rather broadly, the more important features of the water-based air filter system in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new water-based air filter system which has many of the advantages of the air filtering systems mentioned heretofore and many novel features that result in a new water-based air filter system which is not anticipated, rendered obvious, suggested, or even implied by any of the prior art air filtering systems, either alone or in any combination thereof.

Still another object of the present invention is to provide a new water-based air filter system for recycling and cleaning the air found in industrial plants, in particular.

Still yet another object of the present invention is to provide a new water-based air filter system that is easy and convenient to set up and use.

Even still another object of the present invention is to provide a new water-based air filter system that uses water to remove harmful pollutants from the air and re-introduce clean air into the workplace, in particular.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
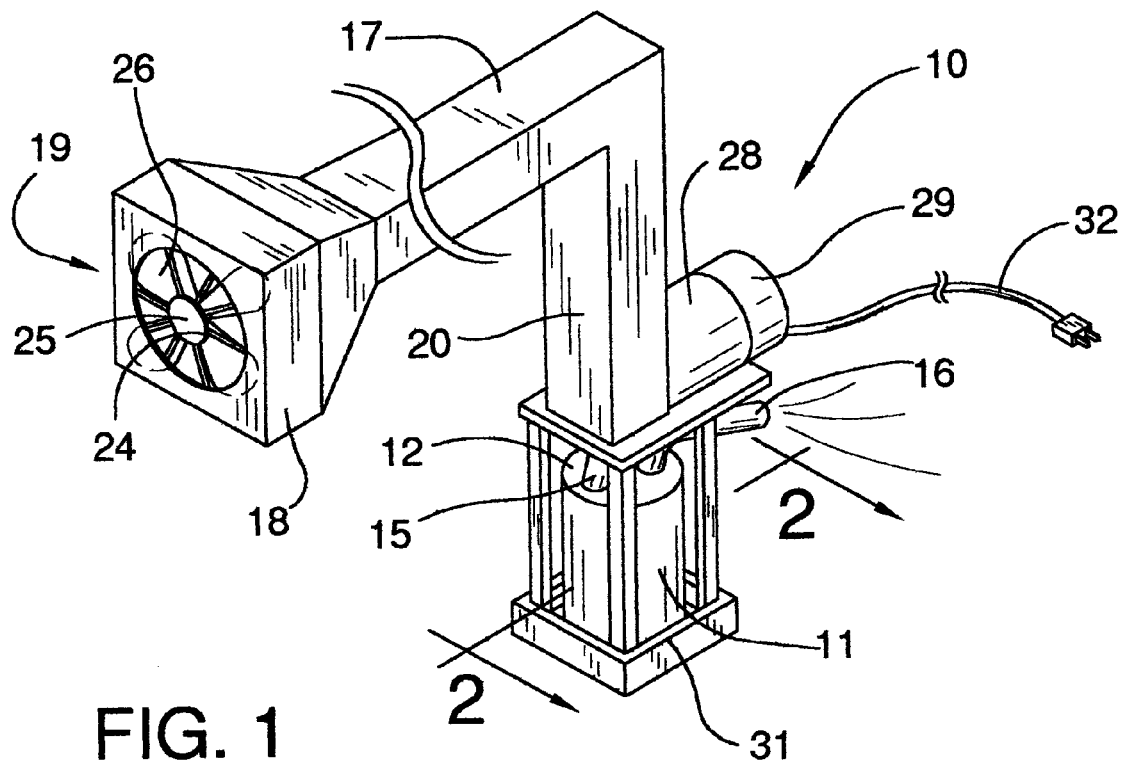
FIG. 1 is a perspective view of a new water-based air filter system according to the present invention.
Figure 2:
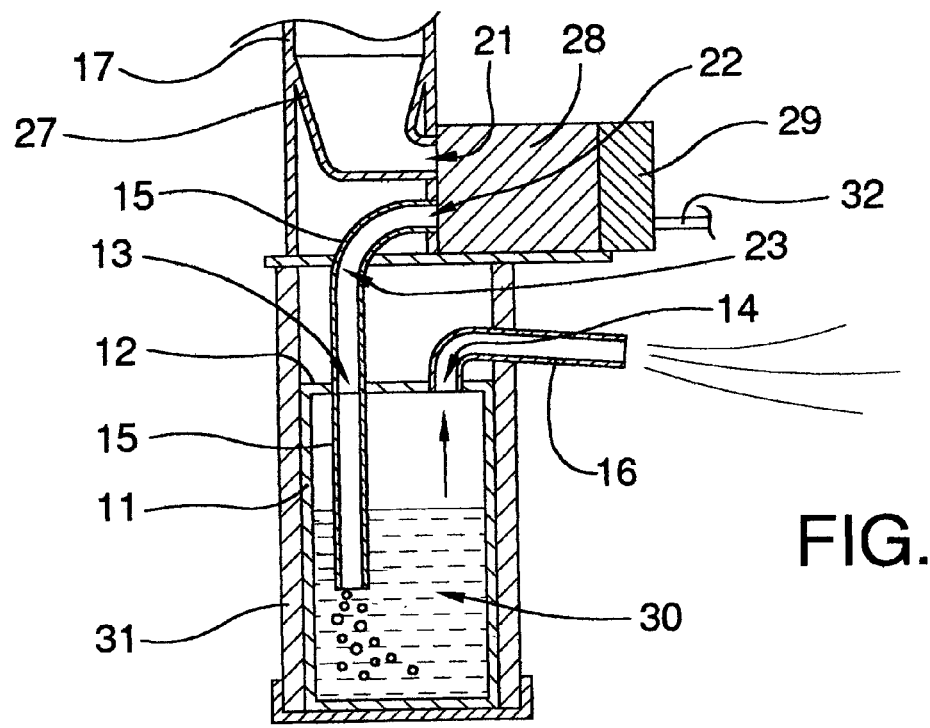
FIG. 2 is a partial cross-sectional view of the present invention.

With reference now to the drawings, and in particular to FIGS. 1 through 2 thereof, a new water-based air filter system embodying the principles and concepts of the present invention and generally designated by the reference numeral 10 will be described.

As best illustrated in FIGS. 1 through 2, the water-based air filter system 10 generally comprises a support base 31. A tank 11 is conventionally disposed in the support base 31 and is at least partially-filled with water 30 and has an inlet hole 13 being disposed through a wall 12 thereof, and also has an outlet hole 14 being disposed through the wall 12 thereof. An air inlet spout 15 is extended through the inlet hole 13 and into the water 30 in the tank 11. An air outlet spout 16 is extended through the outlet hole 14 and is extended from the tank 11.

An outside air suction assembly is securely and conventionally mounted upon the support base 31 and is conventionally connected to the air inlet spout 15 for drawing polluted air into the water 30 in the tank 11. The outside air suction assembly includes an air duct member 17 being conventionally mounted to the support base 31, and also includes a fan assembly being conventionally disposed in the air duct member 17 for drawing air into the air duct member 17 from the outside, and further includes a suction pump assembly being conventionally attached to the air duct member 17 for circulating the air drawn into the air duct member 17 through the water 30 in the tank 11. The air duct member 17 includes an enlarged inlet portion 18 having an inlet opening 19 being disposed in an end wall thereof; and also includes an outlet portion 20 having outlet openings 21,22 being disposed through a side wall thereof, and also having an outlet port 23 being disposed through an end wall thereof. The air inlet spout 15 is conventionally disposed through the outlet port 23 and through one of the outlet openings 22. The fan assembly includes a fan motor 24 having a rotating shaft 25 and being adapted to be connected to a power source via a power cord 32, and also includes fan blades 26 being radially and conventionally attached to the shaft 25 and being disposed in the inlet opening 19 to draw air from the outside into the air duct member 17. The pump assembly includes a funnel-shaped air chute 27 being conventionally disposed in the outlet portion 20 of the air duct member 17 and being extended through one of the outlet openings 21, and also includes a conventional centrifugal pump member 28 being conventionally connected to the funnel-shaped air chute 27, and further includes a pump motor 29 being conventionally attached to the pump member 28 and being adapted to be energized by a power source via the power cord 32 for energizing the pump member 28 to circulate air drawn into the air duct member 17 into the water 30 contained in the tank 11 with the water 30 filtering out the pollutants in the air being drawn through the air duct member 17 and clean air being expelled from the tank 11 through the air outlet spout 16.

In use, the fan assembly draws air containing pollutants in the workplace into the inlet opening of the air duct member 17, and the pump assembly circulates the air containing pollutants into the water 30; whereupon, the water removes the pollutants from the air and the now recycled air is expelled from the tank 11 through the outlet spout 16 and back into the workplace.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the water-based air filter system. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A water-based air filter system comprising:

a support base;

a tank being disposed in said support base and being at least partially-filled with water and having an inlet hole being disposed through a wall thereof; and also having an outlet hole being disposed through said wall thereof;

an air inlet spout being extended through said inlet hole and into the water in said tank;

an air outlet spout being extended through said outlet hole and being extended from said tank; and an outside air suction assembly being mounted upon said support base and being connected to said air inlet spout for drawing polluted air into the water in said tank, said outside air suction assembly including an air duct member being mounted to said support base, and also includes a fan assembly being disposed in said air duct member for drawing air into said air duct member, and further including a suction pump assembly being attached to said air duct member for circulating the air drawn into said air duct member through the water in said tank, said air duct member including an enlarged inlet portion having an inlet opening being disposed in an end wall thereof; and also including an outlet portion having outlet openings being disposed through a side wall thereof, and also having an outlet port being disposed through an end wall thereof, said air inlet spout being disposed through said outlet port and through one of said outlet openings.

2. A water-based air filter system as described in claim 1, wherein said fan assembly includes a fan motor having a rotating shaft and being adapted to be connected to a power source, and also includes fan blades being radially attached to said shaft and being disposed in said inlet opening to draw air from the outside into said air duct member.

3. A water-based air filter system as described in claim 2, wherein said pump assembly includes a funnel-shaped air chute being disposed in said outlet portion of said air duct member and being extended through one of said outlet openings, and also includes a pump member being connected to said funnel-shaped air chute, and further includes a pump motor being attached to said pump member and being adapted to be energized by a power source for energizing said pump member to circulate air drawn into said air duct member into the water contained in said tank with the water filtering out the pollutants in the air being drawn through said air duct member and clean air being expelled from said tank through said air outlet spout.

* * * * *